United States Patent
Wilson et al.

(10) Patent No.: US 8,284,917 B2
(45) Date of Patent: Oct. 9, 2012

(54) SYSTEM AND METHOD FOR HANDLING A MEETING REQUEST

(75) Inventors: John Ferguson Wilson, Waterloo (CA); James Andrew Godfrey, Waterloo (CA); Daryl Joseph Martin, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 233 days.

(21) Appl. No.: 12/702,501

(22) Filed: Feb. 9, 2010

(65) Prior Publication Data

US 2011/0194683 A1 Aug. 11, 2011

(51) Int. Cl.
H04M 3/42 (2006.01)

(52) U.S. Cl. ......... 379/202.01; 379/203.01; 379/204.01; 379/205.01; 379/206.01; 379/207.13; 455/416; 370/260; 370/261; 370/262; 709/204

(58) Field of Classification Search ......... 379/202.01–207.01; 455/416; 709/204; 348/14.08, 14.09
See application file for complete search history.

(56) References Cited

U.S. PATENT DOCUMENTS

| | | | |
|---|---|---|---|
| 7,233,786 B1 | 6/2007 | Harris et al. | |
| 2002/0009990 A1* | 1/2002 | Kleier et al. | 455/416 |
| 2002/0075305 A1* | 6/2002 | Beaton et al. | 345/751 |
| 2004/0202303 A1* | 10/2004 | Costa-Requena et al. | 379/205.01 |
| 2007/0173238 A1* | 7/2007 | Ali-Vehmas | 455/416 |
| 2009/0247133 A1* | 10/2009 | Holmen et al. | 455/414.1 |
| 2010/0189242 A1* | 7/2010 | Jenkins et al. | 379/202.01 |

FOREIGN PATENT DOCUMENTS

| | | |
|---|---|---|
| WO | 03039181 A1 | 5/2003 |
| WO | 2008053467 A2 | 5/2008 |

OTHER PUBLICATIONS

European Patent Office, Extended European Search Report for European Patent Application No. 10153101, dated Oct. 11, 2010.
Matias Erny Reichl Hoffman, Response to Communication pursuant to Article 94(3)EPC, filed in respect of European Patent Application No. 10153101.0, dated Oct. 5, 2011.
European Patent Office, Office Communication issued in respect of European Patent Application No. 10153101.0 dated Jul. 19, 2011.
Reichl, Wolfgang, Matias Erny Reichl Hoffman, "Response to the official communication pursuant to Rule 62 EPC dated Oct. 11, 2010", dated Dec. 15, 2010, Germany.

* cited by examiner

*Primary Examiner* — Joseph J Nguyen
(74) *Attorney, Agent, or Firm* — Norton Rose Canada LLP

(57) ABSTRACT

Data processing and communications devices are configured to generate, using command signals received from at least one user input device, a signal set representing a meeting request, the meeting request signal set comprising signals representing one or more parameters for a proposed meeting and configured for causing a second data processing and communications device to initiate a voice call on receipt of command signals representing a response to the meeting request; and forward the generated meeting request signal set to the second data processing and communications device.

14 Claims, 8 Drawing Sheets

SYSTEM AND METHOD FOR HANDLING A MEETING REQUEST

TECHNICAL FIELD

The present disclosure relates generally to electronic devices, and more particularly to a system and method for handling a meeting request on an electronic device.

BACKGROUND

Electronic devices, including communication devices and wireless devices such as mobile communication devices, may communicate with each other through conventional email, and also through newer media such as Instant Messaging (IM), forums. Voice communication may also be available between electronic devices. Certain functions available via email (e.g., using the MIME standard and managing of calendar events), such as meeting requests, may not integrate with other communication media, such as voice.

For example, a meeting organizer requests a meeting with several attendees, and replies to the meeting request are sent from the attendees, for example via email. If there is a meeting conflict or if the meeting request changes, the organizer and attendees have to communicate over a relatively inefficient medium, in this example email, to resolve the conflict or the change.

BRIEF DESCRIPTION OF THE DRAWINGS

Reference will now be made to the drawings, which show by way of example embodiments of the present disclosure, and in which.

It will be noted that throughout the appended drawings, like features are identified by like reference numerals.

DETAILED DESCRIPTION

Figure 1:
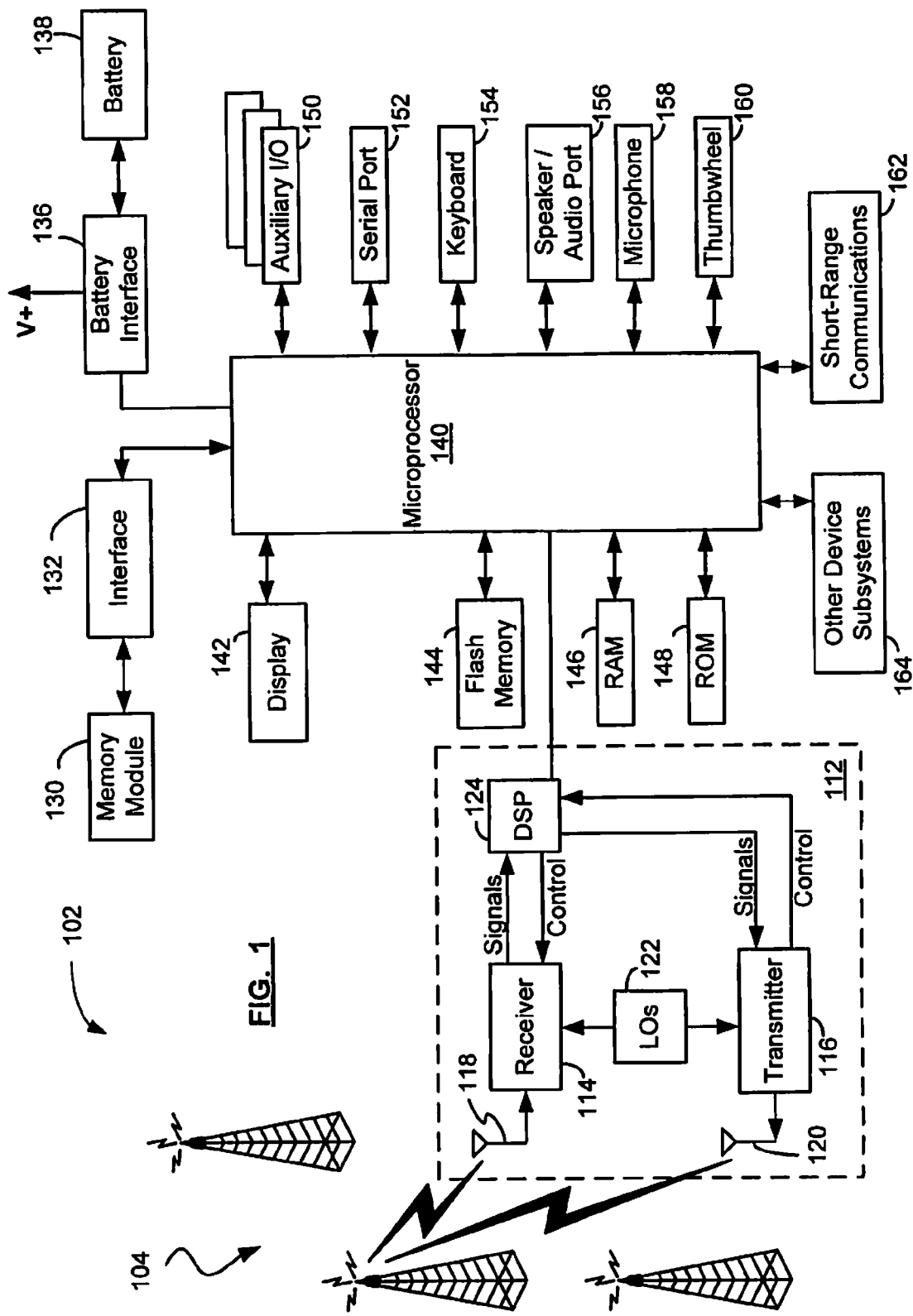
FIG. 1 shows in block diagram form a electronic device suitable for handling a meeting request in accordance with an example embodiment.

In some aspects there is provided a data processing and communications device, comprising at least one data processor configured to execute machine-interpretable instructions for causing the device to: generate, using command signals received from at least one user input device, a signal set representing a meeting request, the meeting request signal set comprising signals representing one or more parameters for a proposed meeting and configured for causing a second data processing and communications device to initiate a voice call on receipt of command signals representing a response to the meeting request; and forward the generated meeting request signal set to the second data processing and communications device.

In some aspects, there is provided a data processing and communications device, comprising at least one data processor configured to execute machine-interpretable instructions for causing the data processing and communications device to: receive a signal set representing a meeting request, the meeting request signal set comprising signals representing one or more parameters for a proposed meeting and configured for causing the data processing and communications device to initiate a voice call on receipt of command signals representing a response to the meeting request; receive command signals representing the response to the meeting request; and in response to the received command signals representing the response to the meeting request, transmit a signal set representing an instruction to initiate the voice call.

In some aspects, there is provided a computer program product having computer executable instructions tangibly recorded thereon, the instructions comprising: instructions for generating, using command signals received from at least one user input device, a signal set representing a meeting request, the meeting request signal set comprising signals representing one or more parameters for a proposed meeting and configured for causing a second data processing and communications device to initiate a voice call on receipt of command signals representing a response to the meeting request; and instructions for forwarding the generated meeting request signal set to the second data processing and communications device.

In some aspects, there is provided a computer program product having computer executable instructions tangibly recorded thereon, the instructions comprising: instructions for receiving a signal set representing a meeting request, the meeting request signal set comprising signals representing one or more parameters for a proposed meeting and configured for causing the data processing and communications device to initiate a voice call on receipt of command signals representing a response to the meeting request; instructions for receiving command signals representing the response to the meeting request; and instructions for transmitting, in response to the received command signals representing the response to the meeting request, a signal set representing an instruction to initiate the voice call.

Reference is first made to FIG. 1, which shows a block diagram illustrating an electronic device 102 suitable for handling a meeting request in accordance with an example embodiment of the present disclosure. It will be understood that references to an electronic device in this disclosure may also refer to a wireless device, a communication device, a data processing and communications device, or a mobile communication device. In the example shown, the electronic device 102 may communicate through a wireless communication network 104. The wireless network 104 may include antennae, base stations, and supporting radio equipment as for supporting wireless communications between the electronic device 102 and other devices connected to wireless network 104. The wireless network 104 may be coupled to a wireless network gateway and to a wide area network, shown in FIG. 2A.

In an example embodiment, the electronic device 102 may be a two-way mobile communication device having at least voice and data communication capabilities, including the capability to communicate with other computer systems. Depending on the functionality provided by the electronic device 102, it may be referred to as a data messaging device, a two-way pager, a cellular telephone with data messaging capabilities, a wireless Internet appliance, or a data communication device (with or without telephony capabilities). The electronic device 102 may communicate with any one of a plurality of fixed transceiver stations within its geographic coverage area.

The electronic device 102 may incorporate a communication subsystem 112, which includes a receiver 114, a transmitter 116, and associated components, such as one or more antenna elements 118 and 120, local oscillators (LOs) 122, and a processing module such as a digital signal processor (DSP) 124. In an example embodiment, the antenna elements 118 and 120 may be embedded or internal to the electronic device 102. As will be apparent to those skilled in the field of communications, the particular design of the communication subsystem 112 may depend on the wireless network 104 in which the electronic device 102 is intended to operate.

The electronic device 102 may send and receive communication signals over the wireless network 104, for example after the required network registration or activation procedures have been completed. Signals received by the antenna 118 through the wireless network 104 may be input to the receiver 114, which may perform such common receiver functions as signal amplification, frequency down conversion, filtering, channel selection, etc., as well as analog-to-digital (A/D) conversion. A/D conversion of a received signal may allow more complex communication functions such as demodulation and decoding to be performed in the DSP 124. In a similar manner, signals to be transmitted may be processed, including modulation and encoding, for example, by the DSP 124. These DSP-processed signals may be input to the transmitter 116 for digital-to-analog (D/A) conversion, frequency up conversion, filtering, amplification, and transmission to the wireless network 104 via the antenna 120. The DSP 124 may not only process communication signals, but may also provide for receiver and transmitter control. For example, the gains applied to communication signals in the receiver 114 and the transmitter 116 may be adaptively controlled through automatic gain control algorithms implemented in the DSP 124.

Network access may be associated with a subscriber or user of the electronic device 102 via a memory module, such as a memory module 130, which may be a Subscriber Identity Module (SIM) card for use in a GSM network or a Universal Subscriber Identity Module (USIM) card for use in a Universal Mobile Telecommunication System (UMTS). The SIM card may be inserted in or connected to an interface 132 of the electronic device 102 in order to operate in conjunction with the wireless network 104. Alternatively, the electronic device 102 may have an integrated identity module for use with systems such as Code Division Multiple Access (CDMA) systems.

The electronic device 102 may also include a battery interface 136 for receiving one or more rechargeable batteries 138. The battery 138 may provide electrical power to at least some of the electrical circuitry in the electronic device 102, and the battery interface 136 may provide a mechanical and electrical connection for the battery 138. The battery interface 136 may be coupled to a regulator (not shown) which may provide power V+ to the circuitry of the electronic device 102.

The electronic device 102 may include a microprocessor 140 which may control the overall operation of the electronic device 102. Communication functions, including at least data and voice communications, may be performed through the communication subsystem 112. The microprocessor 140 may also interact with additional device subsystems such as a display 142, a flash memory 144, a random access memory (RAM) 146, a read-only memory (ROM) 148, auxiliary input/output (I/O) subsystems 150, a data port such as serial port 152, a keyboard or keypad 154, a speaker or audio port 156 for connecting to, for example a set of headphones or an earpiece, a microphone 158, a clickable thumbwheel or thumbwheel 160, a short-range communications subsystem 162, and any other device subsystems generally designated as 164. Some of the subsystems shown in FIG. 1 may perform communication-related functions, whereas other subsystems may provide "resident" or on-device functions. Notably, some subsystems, such as the keypad 154, the display 142, and the clickable thumbwheel 160, for example, may be used for both communication-related functions, such as displaying notifications or entering a text message for transmission over the wireless network 104, and executing device-resident functions such as a clock, a calculator or a task list. Operating system software used by the microprocessor 140 may be stored in a persistent store such as the flash memory 144, which may alternatively be the ROM 148 or similar storage element. Those skilled in the art will appreciate that the operating system, specific device applications, or parts thereof, may be temporarily loaded into a volatile store such as the RAM 146.

The microprocessor 140, in addition to its operating system functions, may enable execution of software applications on the electronic device 102. A predetermined set of applications that control basic device operations, including data and voice communication applications, may normally be installed on the electronic device 102 during or after manufacture. The electronic device 102 may include a personal information manager (PIM) application having the ability to organize and manage data items relating to a user such as, but not limited to, instant messaging, email, calendar events, voice mails, appointments, and task items. One or more memory stores may be available on the electronic device 102 to facilitate storage of information, such as the flash memory 144, the RAM 146, the ROM 148, the memory module 130, or other types of memory storage devices or FLASH memory cards represented by the other device subsystems 164, such as Secure Digital (SD) cards or mini SD cards, etc.

The PIM and/or media applications may have the ability to send and receive data items via either the wireless network 104 or a link to a computer system. The link to the computer system may be via the serial port 152 or the short-range communications subsystem 162. In an example embodiment, PIM and/or media data items may be seamlessly combined, synchronized, and updated via the wireless network 104, with the electronic device user's corresponding data items stored and/or associated with a host computer system thereby creating a mirrored or partially mirrored host computer on the electronic device 102 with respect to such items. This may be useful where the host computer system is the electronic device user's office computer system. Additional applications may also be loaded onto the electronic device 102 through the wireless network 104, the auxiliary I/O subsystem 150, the serial port 152, the short-range communications subsystem 162, or any other suitable subsystem 164, and installed by a user in the RAM 146 or a non-volatile store such as the ROM 148 for execution by the microprocessor 140. Such flexibility in application installation may increase the functionality of the electronic device 102 and may provide enhanced on-device functions, communication-related functions, or both. For example, secure communication applications may enable electronic commerce functions and other such financial transactions to be performed using the electronic device 102.

In a data communication mode, a received data signal representing information such as a text message, an email message, a media file to be transferred, or Web page download may be processed by the communication subsystem 112 and may be input to the microprocessor 140. The microprocessor 140 may further process the signal for output to the display 142, or alternatively to the auxiliary I/O device 150. A user of the electronic device 102 may also compose data items, such as email messages, for example, using the keypad 154 and/or the clickable thumbwheel 160 in conjunction with the primary display 142 and possibly the auxiliary I/O device 150. The keypad 154 may be either a complete alphanumeric keypad or telephone-type keypad. These composed items may be transmitted through the communication subsystem 112 over the wireless network 104 or via the short range communication subsystem 162.

For voice communications, the overall operation of the electronic device 102 may be similar, except that the received signals may be output to the speaker or audio port 156 and signals for transmission would be generated by a transducer such as the microphone 158. Alternative voice or audio I/O subsystems, such as a voice message recording subsystem, may also be implemented on the electronic device 102. Although voice or audio signal output may be typically accomplished primarily through the speaker or audio port 156, the display 142 may also be used to provide an indication of the identity of a calling party, duration of a voice call, or other voice call related information. Stereo headphones or an earpiece may also be used in place of the speaker 156.

The serial port 152 may be normally implemented in a personal digital assistant (PDA) type communication device for which synchronization with a user's computer is a desirable, albeit optional, component. The serial port 152 may enable a user to set preferences through an external device or software application and may extend the capabilities of the electronic device 102 by providing for information or software downloads to the electronic device 102 other than through the wireless network 104. The alternate download path may, for example, be used to load software or data files onto the electronic device 102 through a direct, reliable and trusted connection.

The short-range communications subsystem 162 may be an additional optional component which provides for communication between the electronic device 102 and different systems or devices, which need not necessarily be similar devices. For example, the subsystem 162 may include an infrared device and associated circuits and components, or a wireless bus protocol compliant communication mechanism such as a Bluetooth™ communication module to provide for communication with similarly-enabled systems and devices (Bluetooth™ is a registered trademark of Bluetooth SIG, Inc.). In another example embodiment, the short-range communications subsystem 162 may be a wireless networking communications subsystem, conforming to IEEE 802.11 standards such as one or more of 802.11b, 802.11g, or 802.11n.

Figure 2A:
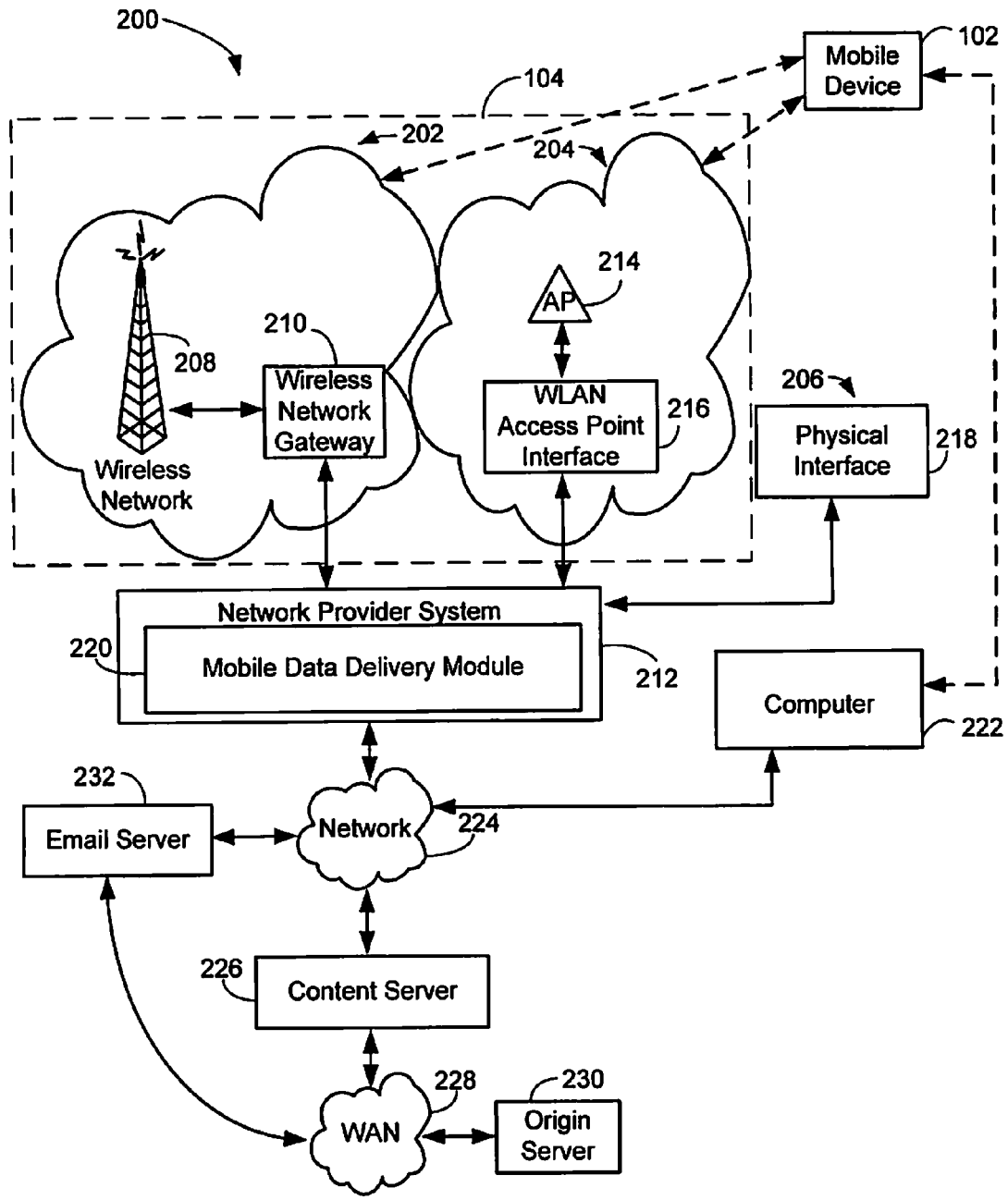
FIG. 2A shows in block diagram form a communication system suitable for providing the operating environment of the electronic device of FIG. 1 in accordance with an example embodiment.

Reference is next made to FIG. 2A, which shows a communication system 200 suitable for use with the electronic device 102 shown in FIG. 1. The communication system 200 generally may include one or more electronic devices 102 (only one of which is shown in FIG. 2A) and the wireless network 104. The wireless network 104 may include a wireless Wide Area Network (WAN) 202, a Wireless Local Area Network (WLAN) 204, and/or other interfaces 206 (which may not necessarily be wireless).

Referring to FIG. 2A, the wireless WAN 202 may be implemented as a packet-based cellular or mobile network that includes a number of base stations 208 (one of which is shown in FIG. 2A) where each of the base stations 208 provides wireless Radio Frequency (RF) coverage to a corresponding area or cell. The wireless WAN 202 may be typically operated by a cellular network service provider that sells subscription packages to users of the electronic devices 102. The wireless WAN 202 may comprise a number of different types of networks, for example, Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network) or various other third generation networks such as EDGE (Enhanced Data rates for GSM Evolution), UMTS (Universal Mobile Telecommunications Systems), or Evolution-Data Optimized (EV-DO).

As shown in FIG. 2A, the communications system 200 may also include a wireless network gateway 210 and one or more network provider systems 212. The wireless network gateway 210 may provide translation and routing services between the network provider system(s) 212 and the WAN 202, which may facilitate communication between the electronic devices 102 and other devices (not shown) connected, directly or indirectly, to the network provider system 212.

The WLAN 204 may comprise a network which in some examples conforms to IEEE 802.11 standards such as one or more of 802.11b, 802.11g, or 802.11n; however, other communications protocols may also be used for the WLAN 204. The WLAN 204 may include one or more wireless RF Access Points (AP) 214 (one of which is shown in FIG. 2A) that collectively provide a WLAN coverage area. For the example embodiment depicted in FIG. 2A, the WLAN 204 may be operated by an enterprise (for example, a business or university in a building or campus type environment) and the access points 214 may be connected to an access point (AP) interface 216. The AP interface 216 may provide translation and routing services between the access points 214 and the network provider system 212 to facilitate communication between two or more of the electronic devices 102 and other devices (e.g., such as desktop computers) connected, directly or indirectly, to the network provider system 212. The AP interface 216 may be implemented using a computer, for example, a server running a suitable computer program or software.

According to an example embodiment, the other interfaces 206 may be implemented using a physical interface 218. The physical interface 218 may include an Ethernet, Universal Serial Bus (USB), Firewire, or infrared (IR) connection implemented to exchange information between the network provider system 212 and the electronic device 102.

The network provider system 212 may comprise a server or server module or a number of servers or server modules which may be located behind a firewall (not shown). The network provider system 212 may include a number of modules including a mobile data delivery module 220. Various modules running on the network provider system 212 may be implemented as a number of services running on a single server or as a number of interconnected servers each running a software program to implement the functionality of the respective module. The network provider system 212 may provide access for the one or more electronic devices 102, through either the wireless WAN 202, the WLAN 204, or the other connection 206 to the electronic devices 102 connected, for example, through an enterprise network 224 (e.g., an intranet), to the network provider system 212. In an example embodiment, the data delivery module 220 may be implemented on a computer, such as the network provider system 212.

The enterprise network 224 may comprise a local area network, an intranet, the Internet, a direct connection, or combinations thereof. The enterprise network 224 may comprise an intranet for a corporation or other type of organization. In at least some example embodiments, the network provider system 212 may be part of the enterprise network 224, and may be located behind a corporate firewall and connected to the wireless network gateway 210 through the Internet. A computer 222 (e.g., a desktop or laptop computer), which may belong to the user of the electronic device 102, may be connected to the enterprise network 224. As described earlier, the electronic device 102 may be temporarily and directly connected to the computer 222 using, for example, the serial port 152. Alternatively, the electronic device 102 may communicate with the computer 222 using the communication subsystem 112 and the WAN 202 and/or the short-range communications subsystem 162 and the WLAN 204.

As shown in FIG. 2A, an application/content server 226 may be connected to the enterprise network 224 and also to another network, for example a Wide Area Network (WAN) 228. In some example embodiments, an email server 232 and/or the content server 226 may form part of the enterprise network 224. The WAN 228 may further connect to other networks. The WAN 228 may comprise or be configured with the Internet, a direct connection, a LAN, a wireless communication link, or any combination thereof. Content providers, such as Web servers, may be connected to the WAN 228, an example of which is shown in FIG. 2A as an origin server 230.

According to an example embodiment, the mobile data delivery module 220 may provide connectivity between the wireless WAN 202 and the WLAN 204 and the other connection 206 and devices and/or networks connected directly or indirectly to the network provider system 212. In an example embodiment, the connectivity provided may be Hypertext Transfer Protocol (HTTP) based connectivity providing an Internet based service connection to devices connected to the wireless WAN 202, the WLAN 204, or the other connection 206 and devices and/or networks connected directly or indirectly to the network provider system 212. The network 224, the application/content server 226, the WAN 228, and the origin server 230, may individually and/or collectively in various combinations act as a content source for the network provider system 212. It will be appreciated that the system shown in FIG. 2A comprises but one possible communication network or configuration of a multitude of possible configurations for use with the electronic devices 102.

Figure 2B:
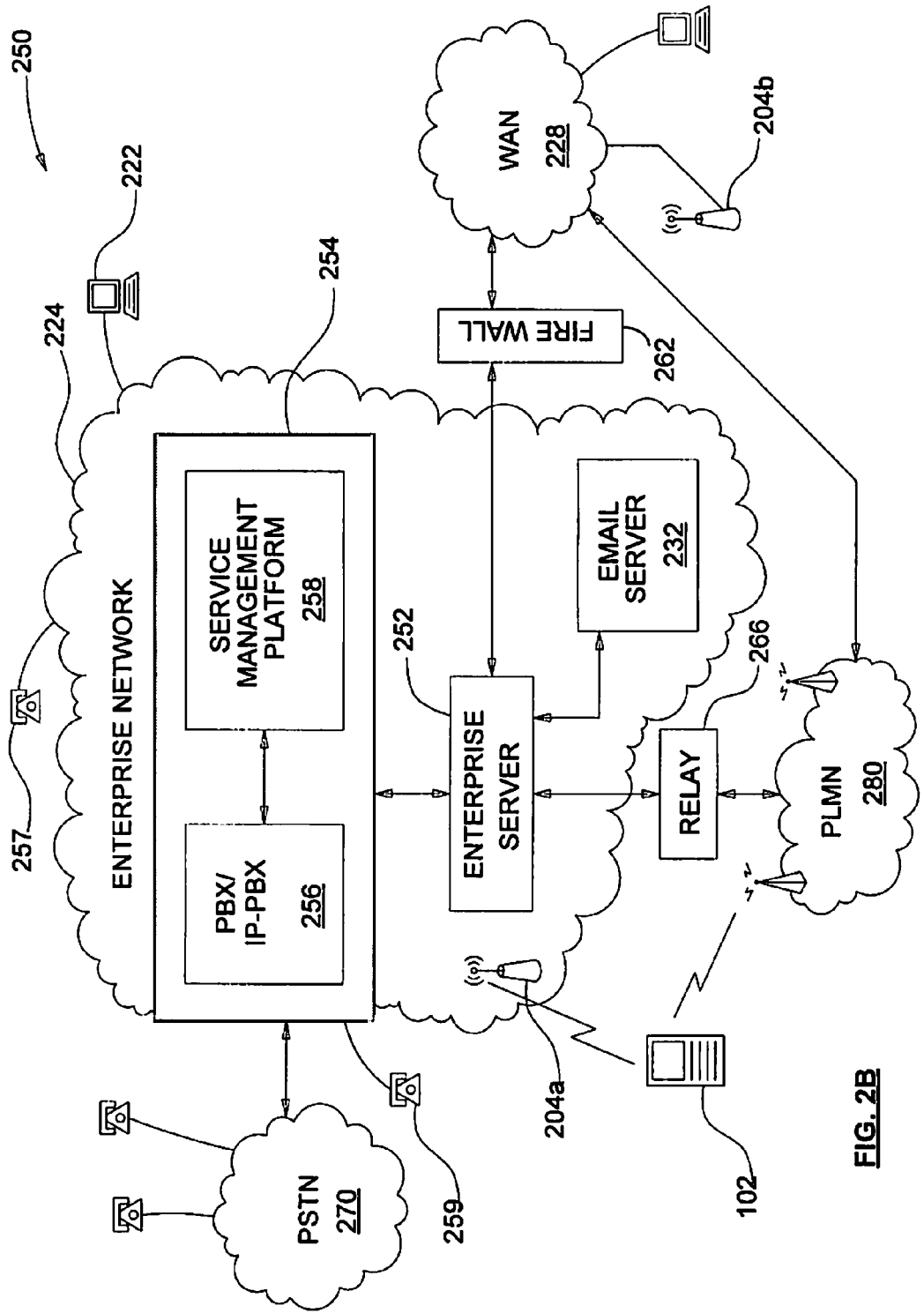
FIG. 2B shows, in block diagram form, an example system suitable for managing voice calls for the electronic device of FIG. 1 in accordance with an example embodiment.

Reference is now made to FIG. 2B, which shows, in block diagram form, an example system, generally designated 250, suitable for the control and management of voice communications for the electronic device 102. The system 250 includes the business or enterprise system 224, which in some example embodiments includes a local area network (LAN). In the description below, the business or enterprise system 224 may be referred to as an enterprise network 224. It will be appreciated that the enterprise network 224 may include more than one network and may be located in multiple geographic areas in some example embodiments.

The enterprise network 224 may be connected, for example through a firewall 262, to a wide area network (WAN) 228, such as the Internet. The enterprise network 224 may also be connected to a public switched telephone network (PSTN) 270, for example via direct inward dialing (DID) trunks or primary rate interface (PRI) trunks.

The enterprise network 224 may also communicate with a public land mobile network (PLMN) 280, which in some examples may be the wireless WAN 202 or, in some examples, a cellular network. The connection with the PLMN 280 may be made via a relay 266.

The enterprise network 224 may also include the wireless local area network (WLAN) 204a featuring wireless access points. Other WLANs 204 may exist outside the enterprise network 224. For example, WLAN 204b may be connected to WAN 228.

The system 250 may include one or more electronic devices 102 (only one shown), which may be enterprise-associated devices. In some examples, the electronic device 102 may be a device equipped for cellular communication through the PLMN 280, an electronic device equipped for Wi-Fi communications over one of the WLANs 204, or a dual-mode device capable of both cellular and WLAN communications. WLANs 204 may be configured in accordance with one of the IEEE 802.11 specifications.

The electronic device 102 may include one or more radio transceivers and associated processing hardware and software to enable wireless communications with the PLMN 280 and/or one of the WLANs 204. In various example embodiments, the PLMN 280 and the electronic device 102 may be configured to operate in compliance with any one or more of a number of wireless protocols, including GSM, GPRS, CDMA, EDGE, UMTS, EvDO, HSPA, 3GPP, or a variety of others. It will be appreciated that the electronic device 102 may roam within the PLMN 280 and across PLMNs 280, in known manner, as the user moves. In some examples, where the electronic device 102 is a dual-mode electronic device, the dual-mode electronic device 102 and/or the enterprise network 224 are configured to facilitate roaming between the PLMN 280 and a WLAN 204, and are thus capable of seamlessly transferring sessions (such as voice calls) from a connection with the cellular interface of the dual-mode electronic device 102 to the WLAN 204 interface of the dual-mode device 102, and vice versa.

The enterprise network 224 typically includes a number of networked servers, computers, and other devices. For example, the enterprise network 224 may connect one or more desktop or laptop computers 222 (one shown). The connection may be wired or wireless in some example embodiments. The enterprise network 224 may also connect to one or more digital telephone sets 257 (one shown).

The enterprise network 224 may include one or more mail servers, such as an email server 232, for coordinating the transmission, storage, and receipt of electronic messages for client devices operating within the enterprise network 224. Examples of email servers include the Microsoft Exchange Server™ and the IBM Lotus Domino™ server. Each user within the enterprise typically has at least one user account within the enterprise network 224. Associated with each user account is message address information, such as an email address. Messages addressed to a user message address associated with a user are stored on the enterprise network 224 in the email server 232. The messages may be retrieved by the user using a messaging application, such as an email client application. The messaging application may be operating on a user's computer 222 or electronic device 102 connected to the enterprise network 224 within the enterprise. In some example embodiments, the user may be permitted to access stored messages using a remote computer, for example at another location via the WAN 228 using a VPN connection. Using the messaging application, the user may also compose and send messages addressed to others, within or outside the enterprise network 224. The messaging application provides instructions to the email server 232 to send a composed message to the addressee, for example via the WAN 228.

The relay 266 serves to route messages received over the PLMN 280 from the electronic device 102 to the corresponding enterprise network 224. The relay 266 also pushes messages from the enterprise network 224 to the electronic device 102 via the PLMN 280.

In this example, the enterprise network 224 also includes an enterprise server 252. Together with the relay 266, the enterprise server 252 functions to redirect or relay incoming email messages addressed to a user's email address within the enterprise network 224 to the user's electronic device 102 and to relay incoming email messages composed and sent via the electronic device 102 out to the intended recipients within the WAN 228 or elsewhere. The enterprise server 252 and relay 266 together facilitate "push" email service for the electronic device 102 enabling the user to send and receive e-mail messages using the electronic device 102 as though the user were connected to an email client within the enterprise network 224 using the user's enterprise-related email address, for example on computer 222.

The enterprise network 224 includes a Private Branch eXchange 256 (although in various example embodiments the PBX may be a standard PBX or an IP-PBX, for simplicity the description below uses the term PBX to refer to both) having a connection with the PSTN 270 for routing incoming and outgoing voice calls for the enterprise. The PBX 256 is connected to the PSTN 270 via DID trunks or PRI trunks, for example. The PBX 256 may use ISDN signaling protocols for setting up and tearing down circuit-switched connections through the PSTN 270 and related signaling and communications. In some example embodiments, the PBX 256 may be connected to one or more conventional analog telephones 259. The PBX 256 is also connected to the enterprise network 224 and, through it, to telephone terminal devices, such as digital telephone sets 257, softphones operating on computers 222, etc. Within the enterprise, each individual may have an associated extension number, sometimes referred to as a PNP (private numbering plan), or direct dial phone number. In some examples, calls outgoing from the PBX 256 to the PSTN 270 or incoming from the PSTN 270 to the PBX 256 are circuit-switched calls. Within the enterprise, e.g. between the PBX 256 and terminal devices, voice calls may be packet-switched calls, for example Voice-over-IP (VoIP) calls.

The enterprise network 224 may further include a Service Management Platform (SMP) 258 for performing at least some aspects of messaging or session control, for example call control and advanced call processing features. The SMP 258 may, in some examples, also perform some media handling. Collectively the SMP 258 and PBX 256 may be referred to as the enterprise communications platform, generally designated 254. It will be appreciated that the enterprise communications platform 254 and, in particular, the SMP 258, is implemented on one or more servers having suitable communications interfaces for connecting to and communicating with the PBX 256 and/or DID/PRI trunks. Although the SMP 258 may be implemented on a stand-alone server, it will be appreciated that it may alternatively be implemented into an existing control agent/server as a logical software component. The SMP 258 may be implemented as a multi-layer platform.

The enterprise communications platform 254 implements the switching to connect session legs and may provide the conversion between, for example, a circuit-switched call and a VoIP call, or to connect legs of other media sessions. In some example embodiments, in the context of voice calls, the enterprise communications platform 254 provides a number of additional functions, for example including automated attendant, interactive voice response, call forwarding, voice mail, etc. It may also implement certain usage restrictions on enterprise users, for example blocking international calls or 1-900 calls. In some example embodiments, Session Initiation Protocol (SIP) may be used to set-up, manage, and terminate media sessions for voice calls. Other protocols may also be employed by the enterprise communications platform 254, for example, Web Services, Computer Telephony Integration (CTI) protocol, Session Initiation Protocol for Instant Messaging and Presence Leveraging Extensions (SIMPLE), and various custom Application Programming Interfaces (APIs), as will be described in greater detail below.

The enterprise communications platform 254 may serve to extend the features of enterprise telephony to the electronic devices 102. For example, the enterprise communications platform 254 may allow the electronic device 102 to perform functions akin to those normally available on a standard office telephone, such as the digital telephone set 257 or analog telephone set 259. Example features may include direct extension dialing, enterprise voice mail, conferencing, call transfer, call park, etc.

Figure 3:
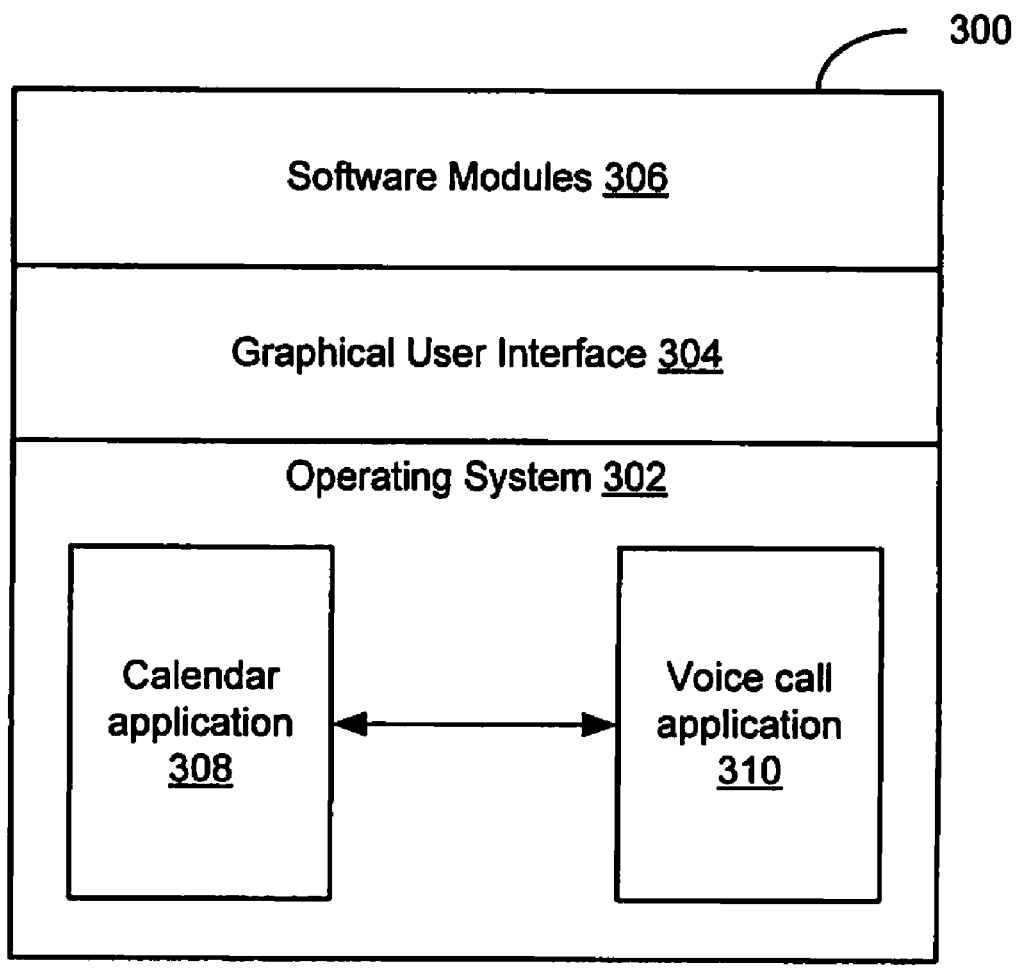
FIG. 3 shows in block diagram form the contents of a memory of the electronic device of FIG. 1.

Reference is next made to FIG. 3, which shows a block diagram illustrating a memory 300 of the electronic device 102. The memory 300 may have various software components for controlling the electronic device 102 and may include, for example, the flash memory 144, the RAM 146, the ROM 148, the memory module 130 and/or the other device subsystems 164. In accordance with an example embodiment, the electronic device 102 may be a multi-tasking mobile communication device for sending and receiving data items, such as instant messages, for making and receiving voice calls, and for creating events and alerts. To provide a user-friendly environment to control the operation of the electronic device 102, an operating system (OS) 302 resident on the electronic device 102 may provide a basic set of operations for supporting various applications typically operable through a user interface such as a graphical user interface (GUI) 304.

For example, the operating system 302 may provide basic input/output system features to obtain input from the auxiliary I/O 150, the keypad 154, the clickable thumbwheel 160, and other input devices, and to facilitate output to the user, for example via the display 142. The GUI 304 is typically a component of the OS 302. One or more software modules 306 for managing communications or providing a personal digital assistant (PDA) or other functions may also be included. The OS 302 may include a calendar application 308 for managing calendar events, for example including scheduling events, generating meeting requests, accepting meeting requests, and tracking or indicating the status of meeting requests. The OS 302 may also include a voice call application 310 for managing voice calls. The calendar application 308 and the voice call application 310 may interact with each other as will be described further below.

The calendar application 308 and the voice call application 310 may be included among the software modules 306. Thus, the electronic device 102 may include computer executable programmed instructions or code for directing the electronic device 102 to implement various applications. The programmed instructions or code may be tangibly embodied in the one or more software modules 306 resident in the memory 300 of the electronic device 102. Alternatively, the programmed instructions may be tangibly embodied on a computer readable medium (such as a DVD, CD, floppy disk or other storage media) having computer executable instructions or code tangibly recorded thereon, which may be used for transporting the programmed instructions to the memory 300 of the electronic device 102. Alternatively, the programmed instructions may be embedded in a computer-readable signal that may be uploaded to the wireless network 104 by a vendor or supplier of the programmed instructions, and this signal may be downloaded through one or more of the interfaces 112, 150, 152, 162 to the electronic device 102 from, for example, the wireless network 104 by end users.

The present disclosure provides a voice reply rule associated with a meeting request that requires a voice reply to the meeting request. The voice reply rule is defined by a meeting organizer when configuring the meeting request. When an attendee replies to a meeting request having a voice reply rule, a voice call to the meeting organizer is automatically initiated. The voice reply rule may include settings that specify one or more conditions under which a voice reply is required. The voice reply rule may be used to require a voice reply in place of a non-voice reply (e.g., an email or other convention reply) or in addition to a non-voice reply.

In some examples, handling of the meeting request occurs at the calendar application 308. For example, the meeting organizer defines the voice reply rule for a meeting request using the calendar application 308 on the organizer's device. Similarly, for example, the calendar application 308 on the attendee's device, in response to the attendee's selection of a reply to the meeting request, interacts with the voice call application 310 to initiate a voice call in accordance with the voice reply rule.

In some examples, information about the meeting request and information about replies to the meeting request are stored in the calendar application 308. The calendar application 308 at each of the organizer's and the attendee's devices may track or indicate the status of the meeting request for each attendee. For example, the meeting request may be considered "unreplied" for an attendee if that attendee has not yet replied to the meeting request; the meeting request may be considered "replied" if the meeting request has been replied to; and the meeting request may be considered "semi-replied" if that attendee has made an unsuccessful or incomplete attempt to reply to the meeting request.

Figure 4:
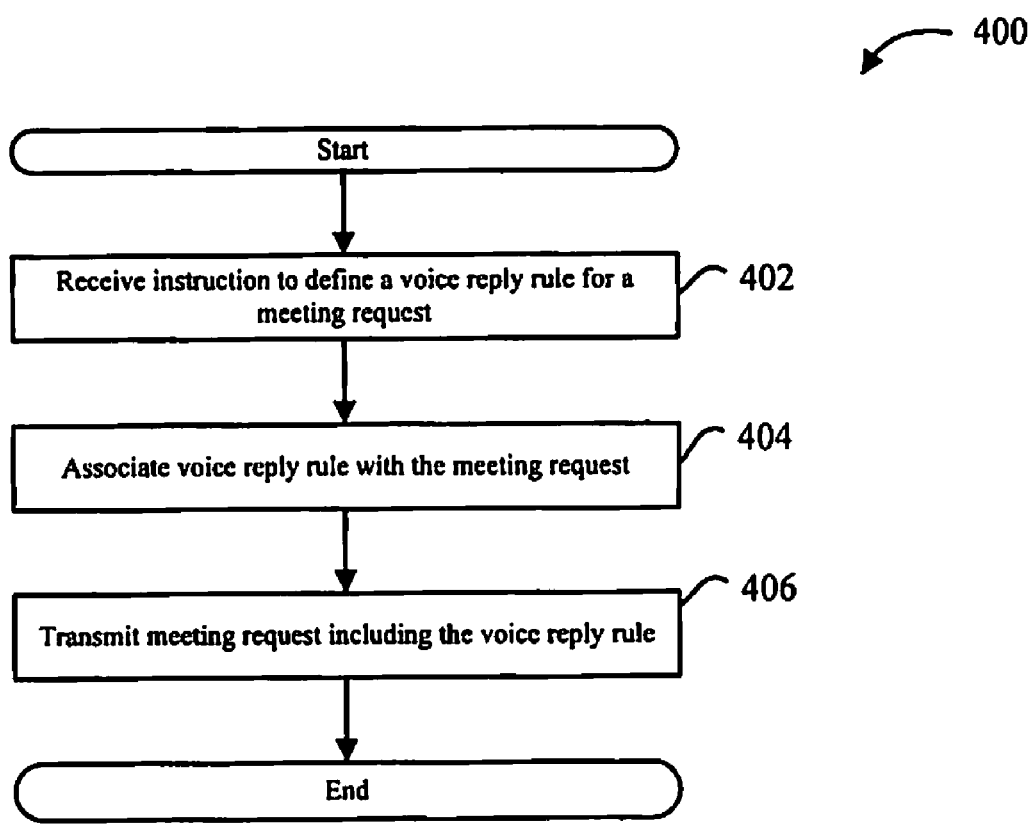
FIG. 4 is a flowchart illustrating an example method of handling meeting requests at an organizer's device in accordance with an example embodiment.
Figure 7A:
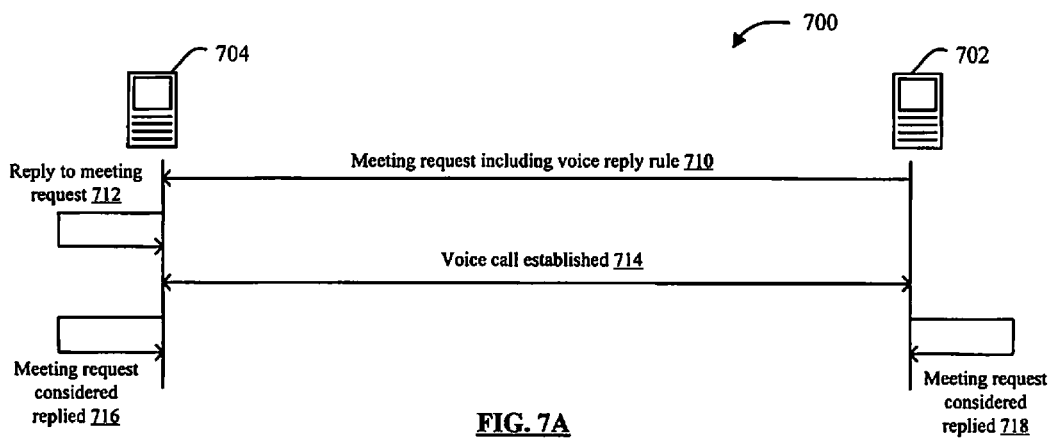
FIGS. 7A and 7B illustrate example communications between an organizer's device and an attendee's device in accordance with example embodiments.

Reference is now made to FIG. 4, which is a flowchart illustrating an example method 400 of handling message requests, according to an example embodiment. The method 400 is an example method for generating a message request having a voice reply rule. Reference is also made to FIG. 7A, illustrating an example set of communications 700, between an organizer's device 702 and an attendee's device 704 according to an example embodiment. Each of the organizer's device 702 and the attendee's device 704 may be the electronic device 102 or the computer 222, or any other suitable computing device.

At 402, an instruction to define a voice reply rule for a meeting request is received. In some examples, the instructions may be received as command signals from the input device, such as the keyboard 154 or the thumbwheel 160. For example, a signal representing the instruction is received at the calendar application 308 of the organizer's device 702, such as in response to a user input. For example, this may be in response to a selection by a meeting organizer to create a voice reply rule for a new or existing meeting request, using an electronic device 102 or a computer 222. This may be an option provided as part of the generation of a meeting request. In addition to providing the option to define the voice reply rule, the meeting organizer may be provided with other meeting request options, such as an option to select a list of attendees, and for configuring the meeting request (e.g., start time, end time, location, notes, etc.). The voice reply rule may include settings that specify when a voice reply is required (e.g., which attendees require a voice reply, type of response requiring a voice reply, hard or soft voice reply rule), which will be described further below.

In some examples, the voice reply rule may be pre-defined in the organizer's device 702 (e.g., such a rule may be pre-defined by the organizer prior to creation of the meeting request), in which case defining a voice reply rule for the present meeting request may require only the selection of a pre-defined rule from a list of available pre-defined rules. For example, it may be the case that a voice reply is always required from attendee A, in which case the organizer's device 702 may have stored a pre-defined voice reply rule specifying that a voice reply is required for attendee A. This pre-defined rule may be selected by the organizer when the meeting request is generated, or may be automatically associated with any meeting request that includes attendee A.

At 404, the voice reply rule is associated with the meeting request. The voice reply rule specifies a voice call for replying to the meeting request, for example according to the settings selected in 402. Thus, the meeting request including the voice reply rule is generated. In some examples, the meeting request may be in the form of a signal set, including signals representing one or more parameters for a proposed meeting (e.g., start time, end time, location, notes, etc.), which would be interpreted by the electronic device 102 or the computer 222 as a meeting request. The voice reply rule may be in the form of signals within the signal set that cause the attendees' devices 704 to initiate a voice call upon receipt of command signals (e.g., signals representing an attendee response) in response to the meeting request.

At 406, the meeting request including the voice reply rule is transmitted. For example, a signal set 710 representing the meeting request is sent out, such as using the communication subsystem 112. The meeting request is transmitted to the attendees' devices 704, for example via the communication system 200 or the system 250. The meeting request may include information for establishing a voice call with the organizer, for example a phone number or other contact information for the organizer.

A voice call initiated in accordance with the voice reply rule may be received at the organizer's device 702. For example, a signal set, from the attendee's device 704, representing a request for establishing a voice call is received at the voice call application 310 of the organizer's device 702. The signal from the attendee's device 704 may be in response to a reply (e.g., command signals representing a response at the attendee's device 704) to the meeting request 712 at the attendee's device 704, as will be described further below. The voice call may be accepted and a voice call established 714 between the attendee and the organizer. This may be according to conventional voice call methods. Once the voice call is established, the meeting request may be considered "replied" 716, 718 at both the attendee's device 704 and the organizer's device 702, for example the meeting may be marked with the reply (e.g., "accept", "decline" or "tentative") in the respective calendar application 308 of each of the attendee's device 704 and the organizer's device 702. For example, a signal set may be generated at the organizer's device 702 and/or the attendee's device 704 to indicate that the meeting request has been replied to.

Figure 5:
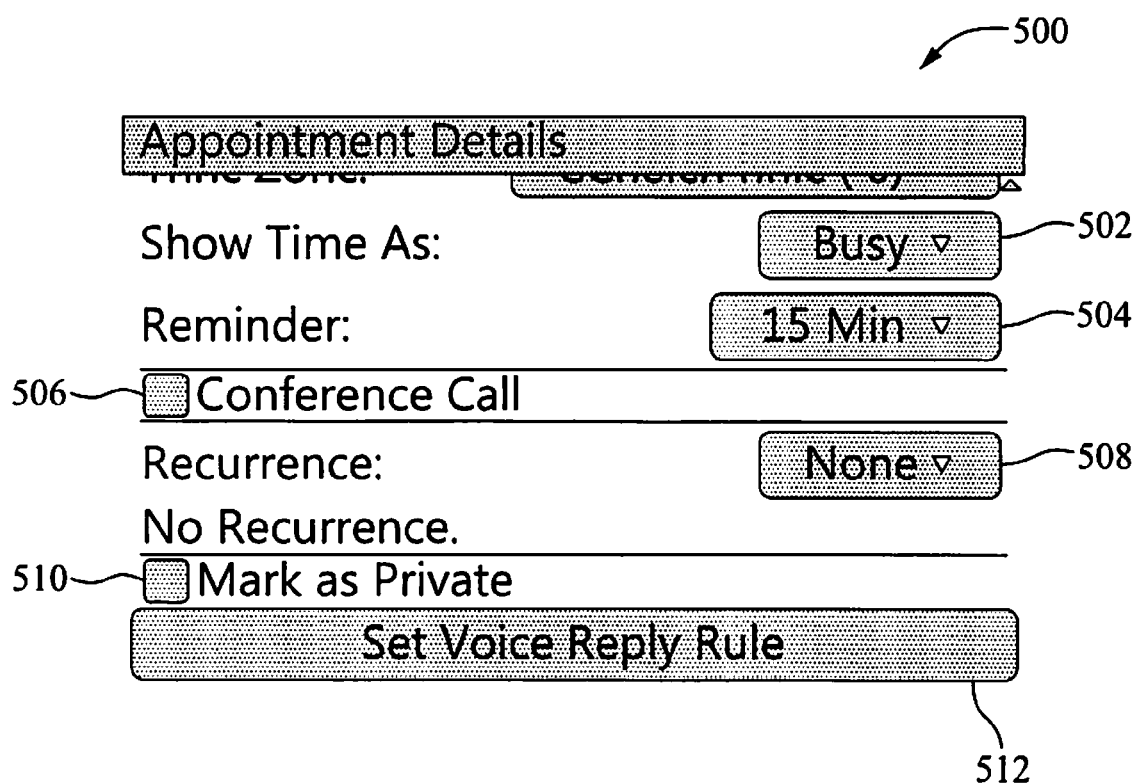
FIG. 5 shows an example interface suitable for configuring a meeting request in accordance with an example embodiment.

Reference is now made to FIG. 5, showing an example interface 500 for generating or configuring a meeting request in accordance with an example embodiment. The interface 500 may be provided to the meeting organizer, for example as part of the method 400. In the example shown, the interface 500 provides an option for selecting a meeting status 502, an option for setting a reminder 504, an option to set a conference call 506, an option to set recurrence 508, and option to set a private status 510, and an option to define a voice reply rule 512. In response to a selection of the option 512, the organizer may be provided with a further interface (not shown) for configuring voice reply rule settings (e.g., attendees requiring a voice reply, type of response requiring a voice reply, hard or soft voice reply rule).

Figure 6:
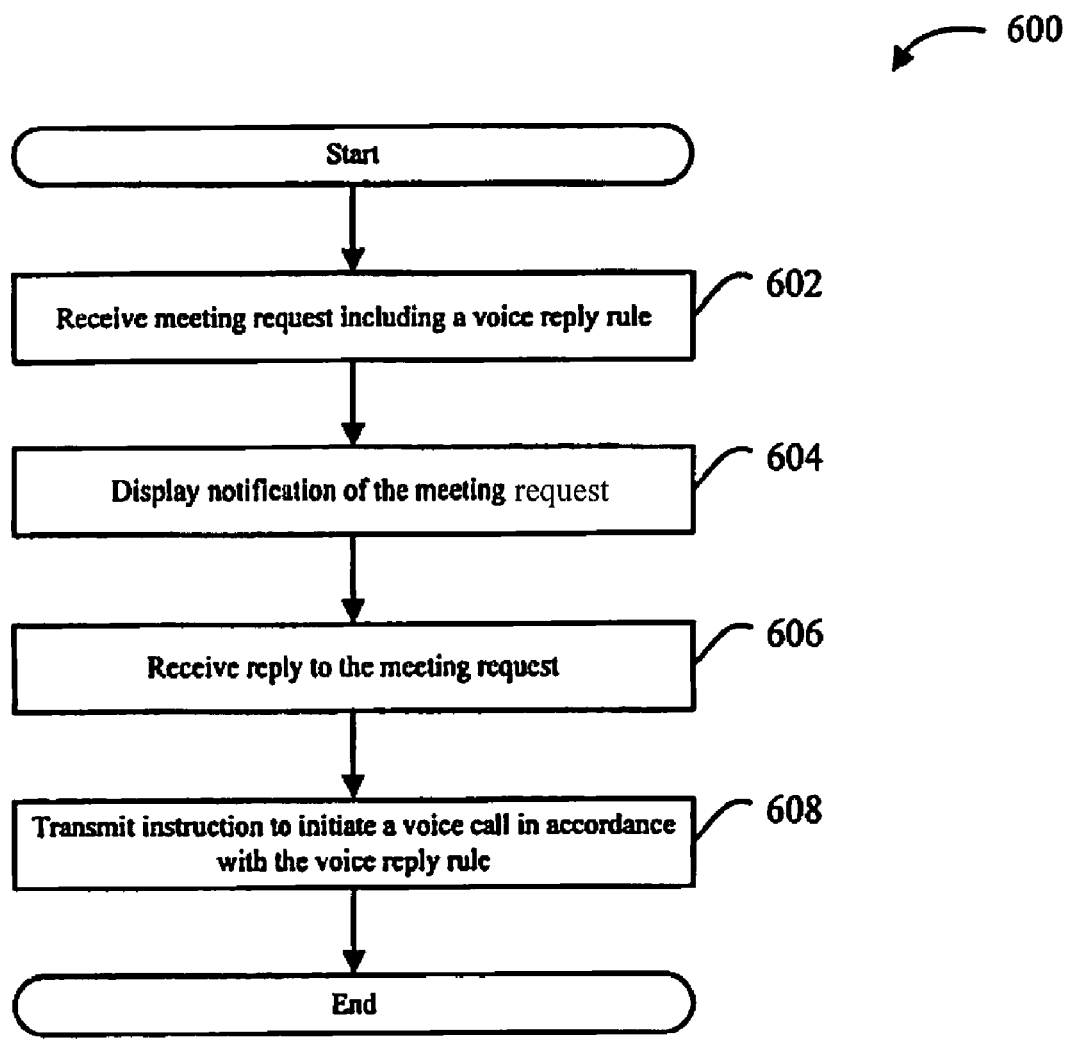
FIG. 6 is a flowchart illustrating an example method of handling meeting requests at an attendee's device in accordance with an example embodiment.

Reference is now made to FIG. 6, which is a flowchart illustrating an example method 600 for managing meeting requests, in accordance with an example embodiment. The method 600 is an example method for responding to a meeting requesting having a voice reply rule. Reference is again made to FIG. 7A.

At 602 a meeting request, including a voice reply rule, is received. For example, a signal set 710 representing the meeting request is received at the attendee's device 704, such as at the calendar application 308. The voice reply rule specifies a voice call is required for replying to the meeting request. As described with reference to FIG. 5, in some examples the signal set 710 representing the meeting request includes signals representing parameters for the meeting and the voice reply rule may be in the form of signals for causing the attendee's device 704 to initiate a voice call upon receipt of a response (e.g., in the form of command signals) to the meeting request.

At 604, a notification of the meeting request is displayed. For example, a pop-up, a GUI or other suitable interface is displayed on the display 142, informing the attendee that a voice call is required to reply to the meeting request. The notification may provide an option to select an "accept", "decline" or "tentative" reply to the meeting request. In some examples, the notification is in the form of an email.

At 606, a reply to the meeting request is received. For example, a command signal 712 representing the reply to the meeting request is received, such as at the calendar application 308, in response to input from the attendee. The reply may be a selection of "accept", "decline" or "tentative". The reply to the meeting request may be in response to the notification displayed in 604. For example, when the attendee is first notified of the meeting request (e.g., via a pop-up, a GUI or other suitable interface), the attendee may right away select a reply option, via the notification. Alternatively, the reply to the meeting request may be via a later selection of the meeting request. For example, the attendee may not reply right away to the notification, but at a later time, open up the meeting request (e.g., using the calendar application 308) and select a reply option.

At 608, in response to the reply received in 606, and where specified by the voice reply rule, an instruction to initiate a voice call in accordance with the voice reply rule is transmitted. For example, a signal set representing the instruction to initiate the voice call is transmitted, such as from the calendar application 308 to the voice call application 310. The voice call application 310 then initiates the voice call to the meeting organizer, according to conventional methods. For example, initiation of the voice call may be through via Session Initial Protocol (SIP), based on contact information of the organizer's device 702 included in the meeting request.

In some examples, where the attendee's device 704 does not include voice capabilities or is otherwise unable to support the implementation of the voice reply rule, the voice reply rule may not be processed and the voice call may not be initiated. In some examples, where the voice reply rule cannot be implemented on an attendee's device 704, signals representing a failure to implement the voice reply rule may be transmitted to the organizer's device 702 (e.g., in the form of an error message).

The instruction is transmitted only where specified by the voice reply rule and in accordance with the voice reply rule. For example, the voice reply rule may include one or more voice reply rule settings that specify a voice reply is required for one or more conditions.

A voice call 714 between the organizer and the attendee may then be established using conventional methods, for example using protocols such as SIP, Web Services, Computer Telephony Integration (CTI) protocol, and other such suitable protocols.

Figure 7B:
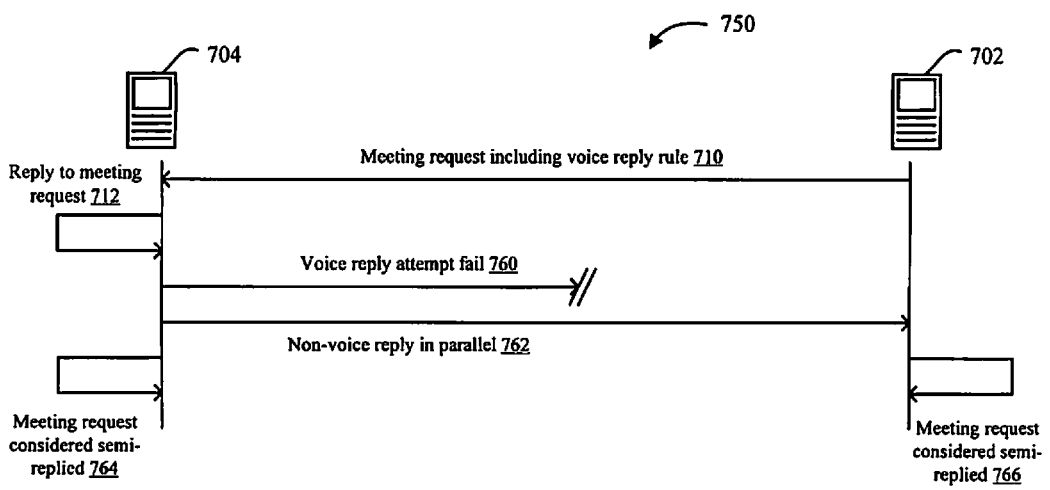

Reference is now made to FIG. 7B, illustrating an example set of communications 750 between the organizer's device 702 and the attendee's device 704. As in FIG. 7A, a signal set 710 is transmitted representing a meeting requesting including a voice reply rule, and a reply to the meeting request 712 is made at the attendee's device 704.

In the example shown, where a voice reply is required in accordance with the voice reply rule, when a voice call attempt is made from the attendee to the organizer, for example at 608, an additional non-voice reply, which may be a conventional reply such as an email reply, is transmitted from the attendee to the organizer, in parallel with the voice reply attempt. For example, a signal set 762 representing a non-voice reply to the meeting request is transmitted (e.g., the non-voice reply may be an email reply from the attendee's device 704 to the organizer's device 702). The signal set 762 representing the non-voice reply may be received at the organizer's device 702, for example at an email application, even where a voice reply attempt fails 760 (e.g., where the organizer is not available to receive a voice call).

In some examples, the reply to the meeting request is not considered fully replied to unless the required voice call between the attendee and the organizer, in accordance with the voice reply rule, is established. For example, where a voice reply attempt fails between the attendee and the organizer, the calendar application 308 on the attendee's device 704 may consider the meeting request as "semi-replied" 764 (e.g., indicated with signals representing the status "pending accept", "pending decline" or "pending tentative", to indicate that an unsuccessful voice reply attempt was made to respond to the meeting request). In the example where a non-voice reply is transmitted in parallel with the voice reply, where the voice call attempt fails, when the non-voice reply is received at the organizer's device, in the absence of an established voice call, the calendar application 308 on the organizer's device 702 may similarly mark the meeting request as being "semi-replied" by that attendee 766.

In some examples, when a voice call request is received at the organizer's device 702 but before a voice call is established between the attendee and the organizer, the organizer may be presented with an additional message, such as an automated message via the enterprise communication platform 254 or the enterprise server 252, indicating that the voice call is in response to the meeting request. The message may also provide the option of accepting or declining the voice call. If the option to accept the voice call is selected, then the voice call between the attendee and the organizer is established. When the voice call is established between the organizer and the attendee, the meeting request is considered "replied" (e.g., indicated by the respective calendar applications 308 on each user's device as "accepted", "declined" or "tentative") by both the organizer's device 702 and the attendee's device 704.

In some examples, the voice reply rule may include at least one voice reply rule setting, specifying at least one condition where a voice reply is required. For example, the voice reply rule setting may specify an attendee requiring a voice reply, a reply type requiring a voice reply, and a strictness level of the voice reply rule, as described below. A voice reply rule may include one or more of these settings in any suitable combination. Other settings not described below may be included in the voice reply rule.

In an example of a voice reply rule setting, the voice reply rule setting may specify one or more attendees requiring a voice reply. For example, the organizer may right-click on an attendee name (not shown) in the interface 500 and select an option (e.g., a "Respond by voice" option) to specify that a voice reply is required from that attendee. This voice reply rule setting may provide the organizer with the option of selecting the attendees from whom a voice reply is required while a non-voice reply (e.g., a conventional email reply) from the other attendees is sufficient. The organizer may thus be provided the option to limit voice replies to those attendees of particular interest or particular importance.

In another example of a voice reply rule setting, the voice reply rule setting may specify that a voice call is required only for specific reply types, such as selection of an "accept" or a "decline" reply. For example, the voice reply rule setting may specify that a voice call is required when the reply to the meeting request is "decline", but not when the reply is "accept". Thus, if the attendee declines the meeting request, then the meeting request is not considered "replied" until a voice call is established between the attendee and the organizer. However, if the attendee accepts the meeting request, then a non-voice reply (e.g., via email) is sufficient for the meeting request to be considered "replied" and a voice call is not initiated. For example, the organizer, when configuring the meeting request, may be provided with options for configuring the voice reply rule, such as "Only respond by voice if declined" or "Respond by voice if declined or tentative". This may provide the organizer with more flexibility for the voice reply rule, and may limit the number of voice calls the organizer receives to only those that are of interest to the organizer. For example, the organizer might not be concerned if an attendee accepts a meeting request, but may wish to discuss cases where the meeting request is declined.

In another example of a voice reply rule setting, the voice reply rule setting may specify how strictly the voice reply rule is applied. For example, the voice reply rule setting may specify a hard voice reply rule or a soft voice reply rule. If a hard voice reply rule is specified, the selected attendee is required to initiate a voice reply, and the meeting request is not considered "replied" until a voice call has been established between the organizer and the attendee. Thus, if the voice call attempt was unsuccessful, another voice call attempt must be initiated by the attendee to reply to the meeting request. If a soft voice reply rule is specified, the attendee is required to initiate a voice reply to the meeting request, however if the voice call attempt is unsuccessful (e.g., the organizer was away and the call was sent to voicemail), the meeting request is still considered "replied" at the organizer's device 702. For example, where a soft voice reply rule is specified, a parallel transmission of a non-voice reply, as described above, may be received at the organizer's device 702, and may result in the meeting request being considered "replied", such as by the calendar application 308 marking the meeting request as "accepted", in the absence of an established voice call. Thus the attendee is not required to attempt another voice call. For example, the organizer may specify a hard voice reply rule an important meeting but a soft voice reply rule to an optional meeting. This may lessen the burden on the attendee to repeat voice call attempts.

The voice reply rule settings described above may be used alone or in combination. For example, the voice reply rule may include a voice reply setting specifying the attendees requiring a voice reply, and additionally include a voice reply setting specifying the strictness level of the voice reply rule for each specified attendee. This may allow the organizer to specify a hard voice reply rule for mandatory attendees but a soft voice reply rule for optional attendees. Other such combinations are possible, and may include other voice reply rule settings not explicitly described above.

In some examples, where the attendee responding according to a hard voice reply rule fails to establish a voice call with the organizer, a notification (e.g., a non-voice reply, such as an email) is provided to the organizer that a reply to the meeting request was attempted by the attendee. This notification may also contain information about the nature of the reply, for example whether the reply is "accept", "decline" or "tentative". The information in the notification may provide the organizer with information to either call back to the attendee, change the meeting request, or ignore the notification and wait for the attendee to attempt another voice call. In some examples, this notification may be the same as or included with the non-voice reply (e.g., email message) described above.

In some examples, where the meeting request including the voice reply rule has been sent to the attendees, the voice reply rule may be subsequently changed or removed by the organizer. This may be possible even after an attendee has already replied to the meeting request. For example, consider the case where an attendee attempts a voice reply, but is unsuccessful in establishing a voice call with the organizer. Hence, the meeting request is still considered "unreplied" in each of the organizer's or the attendee's respective calendar applications 308. Information about this attempted voice reply may be stored in the organizer's and/or the attendee's device 702, 704. This information may include, for example, time of attempt and the type of reply (e.g., "accept", "decline" or "tentative"), and may be provided in a non-voice reply transmitted in parallel to the voice reply attempt. When the voice reply rule is removed or when the voice reply rule is changed such that a voice reply is no longer required (e.g., the voice reply rule no longer specifies a required voice reply for that attendee or for an "accept" reply), establishment of a voice call is no longer required for replying to the meeting request. This change to or removal of the voice reply rule may be communicated to the attendee's device 704, for example by transmitting a signal set representing the updated meeting request with the voice reply rule having been changed or removed.

Information about the attempted reply (e.g., information stored in the organizer's device 702 and the attendee's device 704 where the information is provided in a received non-voice reply), may be automatically applied to the meeting request, such that the meeting request is considered "replied" (e.g., is accordingly marked in the respective calendar applications 308 on the organizer's and the attendee's devices 702, 704). Where the stored information is stored only in the attendee's device 704 (e.g., where there is no parallel transmission of a non-voice reply), removal of the voice reply rule may trigger the attendee's device 704 to automatically transmit a non-voice reply to the meeting request, for example by email, the non-voice reply including the stored information about the attempted reply, resulting in the meeting request being considered "replied" (e.g., accordingly marked in the respective calendar applications 308 of the organizer's and the attendee's devices 702, 704).

In some examples, the stored information about the attempted reply may be additionally stored in a central server (e.g., an email server) and signals representing the stored information may be transmitted to the organizer's device 702 automatically when the voice reply rule is removed or no longer applicable. Signals may be similarly transmitted to the attendee's device 704. The respective calendar applications 308 in the organizer's device 702 and/or the attendee's device 704 may be updated accordingly.

While the steps of the method 400 and the method 600 are shown as occurring in a particular order, it will be appreciated by those skilled in the art that at least some of the steps are interchangeable and may occur in different orders than that shown without materially affecting the end results of the method 400 or the method 600. Additionally, while the method 400 and the method 600 is with regards to the calendar application 308 and the voice call application 310, it will be understood by those skilled in the art that other applications or modules may be suitable for carrying out the method 400 or the method 600. The steps described may be carried out by a single application or module, or may be carried out by several different applications or modules.

While example communications 700 and 750 are shown, those skilled in the art will appreciate that the communications 700 and 750 are for illustration only and variations are possible.

While the present disclosure refers to a the use of the clickable thumbwheel 160, the keyboard 154, an input device, or similar navigation and input mechanisms for navigation on the electronic device 102, it will be appreciated by those skilled in the art that navigation, input or both may be provided by the use of a touch sensing component. For example, the display 142 may be a touch sensing display. Navigation or input on a touch sensing component may be by contacting the display directly with fingers, or by using a stylus or a similar pointing device.

While the present disclosure includes description of a method, a person of ordinary skill in the art will understand that the present disclosure is also directed to an apparatus for carrying out the disclosed method and including apparatus parts for performing each described method step, be it by way of hardware components, a computer programmed by appropriate software to enable the practice of the disclosed method, by any combination of the two, or in any other manner. Moreover, an article of manufacture for use with the apparatus, such as a pre-recorded storage device or other similar computer readable medium having computer executable program instructions or code tangibly recorded thereon, or a computer data signal carrying computer readable program instructions or code may direct an apparatus to facilitate the practice of the disclosed method. A device may include a data processor configured to execute machine-interpretable instructions for causing the device to carry out the disclosed method. It is understood that such apparatus, articles of manufacture, and computer data signals also come within the scope of the present disclosure.

The example embodiments of the present disclosure described above are intended to be examples only. Those of skill in the art may effect alterations, modifications and variations to the particular example embodiments without departing from the intended scope of the present disclosure. In particular, selected features from one or more of the above-described example embodiments may be combined to create alternative example embodiments not explicitly described, features suitable for such combinations being readily apparent to persons skilled in the art. The subject matter described herein in the recited claims intends to cover and embrace all suitable changes in technology. All references mentioned are hereby incorporated by reference in their entirety.

The invention claimed is:

1. A data processing and communications device, comprising at least one data processor configured to execute machine-interpretable instructions for causing the device to:
   generate, using command signals received from at least one input device, a signal set representing a meeting request, the meeting request signal set comprising signals representing one or more parameters for a proposed meeting and configured for causing a second data processing and communications device to initiate a voice call on receipt of command signals representing a response to the meeting request, when the response is other than an accept response;
   forward the generated meeting request signal set to the second data processing and communications device;
   receive a signal set representing a non-voice data set representing the response to the meeting request, the non-voice data set including information about the response to the meeting request;
   determine that the signal set representing the non-voice data set was received in absence of a signal set representing establishment of the voice call;
   in response to the determination, generate signals for indicating that an attempt to establish the voice call was unsuccessful; and
   store reply information data containing information about the non-voice data set.

2. The data processing and communications device of claim 1, further configured to:
   in response to a received signal representing a request for establishment of the voice call, the signal set generated by the second data processing and communications device, generate a signal set for indicating, at the first data processing and communications device, that the meeting request has been replied to.

3. The data processing and communications device of claim 1, further configured to:
   receive command signals representing a change to the one or more parameters for the proposed meeting, wherein the meeting request signal set is no longer configured to cause the second data processing and communications device to initiate the voice call; and
   in response to the received signal set representing the change to the one or more parameters for the proposed meeting, generate a signal set for indicating that the meeting request is replied to, using the stored reply information data.

4. The data processing and communications device of claim 1, wherein the one or more parameters for the proposed meeting includes at least one voice reply setting specifying at least one condition, and wherein the meeting request signal set is configured to cause the second data processing and communications device to initiate the voice call when the at least one condition is satisfied.

5. The data processing and communications device of claim 4, wherein the at least one condition specified by the at least one voice reply setting is at least one of: an attendee identity and a strictness level.

6. The data processing and communications device of claim 5, wherein the at least one condition specified by the at least one voice reply setting is an attendee identity, and the voice reply setting specifies initiation of the voice call for one or more required attendees.

7. The data processing and communications device of claim 5, wherein the at least one condition specified by the at least one voice reply setting is a strictness level, and the voice reply setting specifies initiation of the voice call only once for each response to the meeting request.

8. A computer program product having computer executable instructions tangibly recorded thereon, the instructions comprising code to cause a data processing and communications device to:
   generate, using command signals received from at least one input device, a signal set representing a meeting request, the meeting request signal set comprising signals representing one or more parameters for a proposed meeting and configured for causing a second data processing and communications device to initiate a voice call on receipt of command signals representing a response to the meeting request, when the response is other than an accept response;
   forward the generated meeting request signal set to the second data processing and communications device;
   receive a signal set representing a non-voice data set representing the response to the meeting request, the non-voice data set including information about the response to the meeting request;
   determine that the signal set representing the non-voice data set was received in absence of a signal set representing establishment of the voice call;
   generate, in response to the determination, signals for indicating that an attempt to establish the voice call was unsuccessful; and
   store reply information data containing information about the non-voice data set.

9. The computer program product of claim 8 wherein the instructions further comprise code to cause the data processing and communications device to:
   generate, in response to a received signal representing a request for establishment of the voice call, the signal set generated by the second data processing and communications device, a signal set for indicating, at the first data processing and communications device, that the meeting request has been replied to.

10. The computer program product of claim 8 wherein the instructions further comprise code to cause the data processing and communications device to:
    receive command signals representing a change to the one or more parameters for the proposed meeting, wherein the meeting request signal set is no longer configured to cause the second data processing and communications device to initiate the voice call; and
    in response to the received signal set representing the change to the one or more parameters for the proposed meeting, generate a signal set for indicating that the meeting request is replied to, using the stored reply information data.

11. The computer program product of claim 8 wherein the one or more parameters for the proposed meeting includes at least one voice reply setting specifying at least one condition, and wherein the meeting request signal set is configured to cause the second data processing and communications device to initiate the voice call when the at least one condition is satisfied.

12. The computer program product of claim 11 wherein the at least one condition specified by the at least one voice reply setting is at least one of: an attendee identity and a strictness level.

13. The computer program product of claim 12, wherein the at least one condition specified by the at least one voice reply setting is an attendee identity, and the voice reply setting specifies initiation of the voice call for one or more required attendees.

14. The computer program product of claim 12, wherein the at least one condition specified by the at least one voice reply setting is a strictness level, and the voice reply setting specifies initiation of the voice call only once for each response to the meeting request.

* * * * *